(12) United States Patent
Yoo et al.

(10) Patent No.: US 12,118,764 B2
(45) Date of Patent: Oct. 15, 2024

(54) METHOD AND APPARATUS FOR PROCESSING IMAGE BASED ON PARTIAL IMAGES

(71) Applicant: SAMSUNG ELECTRONICS CO., LTD., Suwon-si (KR)

(72) Inventors: Jaehyoung Yoo, Seongnam-si (KR); Changyong Son, Anyang-si (KR); Dongwook Lee, Suwon-si (KR); Jaejoon Han, Seoul (KR); Chang Kyu Choi, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 718 days.

(21) Appl. No.: 17/177,702

(22) Filed: Feb. 17, 2021

(65) Prior Publication Data
US 2022/0067419 A1    Mar. 3, 2022

(30) Foreign Application Priority Data

Aug. 31, 2020  (KR) .................. 10-2020-0110577

(51) Int. Cl.
*G06V 10/44*  (2022.01)
*G06N 3/045*  (2023.01)
(Continued)

(52) U.S. Cl.
CPC ............. *G06V 10/44* (2022.01); *G06N 3/045* (2023.01); *G06N 3/08* (2013.01); *H04N 23/611* (2023.01);
(Continued)

(58) Field of Classification Search
CPC ...... G06V 10/44; G06V 10/454; G06V 10/50; G06V 10/764; G06V 10/806; G06V 20/00;
(Continued)

(56) References Cited

U.S. PATENT DOCUMENTS 9,582,726 B2    2/2017  Pan et al.
10,431,328 B1 * 10/2019  Wang ..................... G06N 3/045
(Continued)

FOREIGN PATENT DOCUMENTS

CN    108764303 A    11/2018
CN    108985376 A    12/2018
(Continued)

OTHER PUBLICATIONS

Chen, Tsan-Wen, et al. "A 0.5 V 4.85 Mbps Dual-Mode Baseband Transceiver With Extended Frequency Calibration for Biotelemetry Applications." *IEEE journal of solid-state circuits* 44.11 (2009): 2966-2976. (11 pages in English).
(Continued)

*Primary Examiner* — Michael S Osinski
(74) *Attorney, Agent, or Firm* — NSIP Law

(57) ABSTRACT

A method and apparatus for processing an image based on partial images. The method includes extracting a feature of a current partial processing region of an input image frame by inputting pixel data of the current partial processing region into a convolutional neural network (CNN), updating a hidden state of a recurrent neural network (RNN) for a context between the current partial processing region and at least one previous partial processing region by inputting the extracted feature into the RNN, and generating an image processing result for the input image frame based on the updated hidden state.

26 Claims, 13 Drawing Sheets

(51) Int. Cl.
*G06N 3/08* (2023.01)
*H04N 23/611* (2023.01)
*H04N 23/65* (2023.01)
*H04N 23/667* (2023.01)
*H04N 23/695* (2023.01)

(52) U.S. Cl.
CPC ......... *H04N 23/651* (2023.01); *H04N 23/667* (2023.01); *H04N 23/695* (2023.01)

(58) Field of Classification Search
CPC .......... G06V 40/16; G06N 3/045; G06N 3/08; H04N 23/611; H04N 23/651; H04N 23/667; H04N 23/695; G06F 18/2413; G06F 18/253; G06F 1/32; G06T 7/11; G06T 7/70; G06T 2207/20081; G06T 2207/20084; G06T 2207/30201
See application file for complete search history.

(56) References Cited

U.S. PATENT DOCUMENTS

| | | | |
|---|---|---|---|
| 10,452,977 B2 | 10/2019 | Son et al. | |
| 10,467,729 B1 | 11/2019 | Perera et al. | |
| 10,536,622 B2 | 1/2020 | Shimada | |
| 10,540,961 B2 | 1/2020 | Arik et al. | |
| 10,839,530 B1* | 11/2020 | Berger | G06N 20/00 |
| 10,997,421 B2* | 5/2021 | Khosla | G06V 20/52 |
| 2017/0091951 A1 | 3/2017 | Yoo et al. | |
| 2017/0124415 A1* | 5/2017 | Choi | G06V 10/764 |
| 2017/0178346 A1* | 6/2017 | Ferro | G06N 3/084 |
| 2017/0262995 A1* | 9/2017 | Li | G06N 3/044 |
| 2018/0033144 A1* | 2/2018 | Risman | G06T 7/0014 |
| 2018/0268548 A1* | 9/2018 | Lin | G06N 3/084 |
| 2018/0300553 A1* | 10/2018 | Khosla | G06N 3/08 |
| 2019/0043178 A1 | 2/2019 | Chen et al. | |
| 2019/0095753 A1* | 3/2019 | Wolf | G06V 30/1983 |
| 2019/0139205 A1 | 5/2019 | El-Khamy et al. | |
| 2019/0188555 A1 | 6/2019 | Roh et al. | |
| 2019/0258878 A1* | 8/2019 | Koivisto | G01S 7/417 |
| 2019/0371433 A1* | 12/2019 | Wang | G16H 30/40 |
| 2020/0134425 A1* | 4/2020 | Chen | G06N 3/08 |
| 2020/0134876 A1* | 4/2020 | Park | G06V 10/764 |
| 2020/0242422 A1* | 7/2020 | Wang | G06V 10/7715 |
| 2021/0027081 A1* | 1/2021 | Zhang | G06T 7/55 |
| 2021/0297585 A1* | 9/2021 | Eki | H04N 23/73 |
| 2022/0245936 A1* | 8/2022 | Valk | G06V 20/13 |
| 2022/0245954 A1* | 8/2022 | Wu | G06V 10/82 |
| 2023/0394813 A1* | 12/2023 | Satoh | H04N 25/745 |

FOREIGN PATENT DOCUMENTS

| | | |
|---|---|---|
| CN | 110503053 A | 11/2019 |
| KR | 10-2018-0126362 A | 11/2018 |
| KR | 10-1993001 B1 | 6/2019 |
| KR | 10-2019-0091858 A | 8/2019 |
| KR | 10-2036955 B1 | 10/2019 |

OTHER PUBLICATIONS

Waqar, Ahmad, et al., "Human Activity Recognition using Multi-Head CNN followed by LSTM", 2019 15th International Conference on Emerging Technologies (ICET), 2019, pp. 1-6, doi: 10.1109/ICET48972.2019.8994412.

Saha, Oindrila, et al., "RNNPool: Efficient Non-linear Pooling for RAM Constrained Inference", arXiv preprint arXiv:2002.11921 (2020).

Extended European Search Report issued on Nov. 29, 2021, in counterpart European Patent Application No. 21178725.4 (8 pages in English).

* cited by examiner

METHOD AND APPARATUS FOR PROCESSING IMAGE BASED ON PARTIAL IMAGES

CROSS-REFERENCE TO RELATED APPLICATIONS

This application claims the benefit under 35 USC § 119(a) of Korean Patent Application No. 10-2020-0110577 filed on Aug. 31, 2020 in the Korean Intellectual Property Office, the entire disclosure of which is incorporated herein by reference for all purposes.

BACKGROUND

1. Field

The following description relates to a method and apparatus for processing an image based on partial images.

2. Description of Related Art

Technological automation of recognition processes has been implemented through processor implemented neural network models, that after substantial training may provide computationally intuitive mappings between input patterns and output patterns. Such specially trained neural network may thereby have a generalization capability of generating a relatively accurate output with respect to an input pattern that the neural network may not have been trained for, for example.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a method of processing an image includes extracting a feature of a current partial processing region of an input image frame by inputting pixel data of the current partial processing region into a convolutional neural network (CNN), updating a hidden state of a recurrent neural network (RNN) for a context between the current partial processing region and at least one previous partial processing region by inputting the extracted feature into the RNN, and generating an image processing result for the input image frame based on the updated hidden state.

The CNN may be a multi-head CNN (MCNN). The extracting may include extracting a plurality of intermediate features of the current partial processing region by inputting the pixel data of the current partial processing region into each head of the MCNN, and generating an encoded feature of the current partial processing region by fusing the plurality of extracted intermediate features.

The updating may include converting the extracted feature to a one-dimensional vector and inputting the one-dimensional vector into the RNN. The one-dimensional vector may include at least one of a channel direction vector and a width direction vector.

The generating may include generating final context data based on the updated hidden state in response to the current partial processing region corresponding to a final partial processing region of the input image frame, and generating the image processing result based on the final context data.

The image processing result may indicate whether there is a target object in the input image frame. The target object may be a human or a human face.

The generating may include generating intermediate context data based on the updated hidden state in response to the current partial processing region not corresponding to a final partial processing region of the input image frame, and generating an intermediate detection result based on the intermediate context data. In response to the intermediate detection result indicating that there is a target object in the input image frame, an image processing process on the input image frame may be terminated without performing an additional image processing process on at least one subsequent partial processing region.

Each partial processing region including the current partial processing region may correspond to a pixel line group for image signal processing (ISP) of an image sensor. The extracting, the updating, and the generating may be performed in a low power mode. The CNN may be trained in advance using object position information related to each partial processing region of a training image frame.

In another general aspect, an apparatus for processing an image includes a processor, and a memory configured to store instructions executable by the processor, wherein in response to the instructions being executed by the processor, the processor is configured to extract a feature of a current partial processing region of an input image frame by inputting pixel data of the current partial processing region into a CNN, update a hidden state of an RNN for a context between the current partial processing region and at least one previous partial processing region by inputting the extracted feature into the RNN, and generate an image processing result for the input image frame based on the updated hidden state.

In another general aspect, an electronic device includes a camera configured to generate an input image frame, a memory configured to store instructions, and a processor configured to execute the instructions stored in the memory to extract a feature of a current partial processing region of an input image frame by inputting pixel data of the current partial processing region into a CNN, update a hidden state of an RNN for a context between the current partial processing region and at least one previous partial processing region by inputting the extracted feature into the RNN, and generate an image processing result for the input image frame based on the updated hidden state.

The extracting, the updating, and the generating may be performed in a low power mode, and the electronic device may be woken up to perform an operation associated with image processing in a normal mode, in response to a target object being detected in the input image frame.

The low power mode may include an always-on mode. The image processing may include object detection, and the operation associated with the image processing may include any one or any combination of object tracking, object recognition, and unlocking.

In another general aspect, an apparatus includes a processor, and a memory configured to store instructions executable by the processor, wherein in response to the instructions being executed by the processor, the processor is configured to extract a feature of a current partial processing region of an input image frame using a convolutional neural network (CNN), determine whether the current partial processing region of the input image frame is a final partial processing region of the input image frame, in a case in which the current partial processing region is not the final partial processing region, repeatedly update a hidden state of a recurrent neural network (RNN) by inputting the extracted feature of the current partial processing region into the RNN, generate intermediate context data based on the updated hidden state, and generate an intermediate detection result based on the intermediate context data until the current partial processing region is the final partial processing region, and in a case in which the current partial processing region is the final partial processing region, update the hidden state of the RNN by inputting the extracted feature of the current partial processing region into the RNN, generate final context data based on the updated hidden state, and generate an image processing result for the input image frame based on the final context data.

After each iteration in the case in which the current partial processing region is not the final partial processing region, the processor may determine whether the intermediate detection result indicates the presence of a target object in the input image frame, and terminate any further processing of the input image frame in a case in which the intermediate detection result indicates the presence of the target object in the input image frame.

In another general aspect, an apparatus includes a processor, and a memory configured to store instructions executable by the processor, wherein in response to the instructions being executed by the processor, the processor is configured to extract a feature of a current partial processing region of an input data frame using a convolutional neural network (CNN), update a hidden state of a recurrent neural network (RNN) by inputting the extracted feature into the RNN, generate context data based on the updated hidden state, generate a detection result based on the context data, determine whether the detection result indicates the presence of target data in the input data frame, in a case in which the detection result indicates the presence of the target data in the input data frame, terminate any further processing of the input data frame, and in a case in which the detection result does not indicate the presence of the target data in the input data frame, continue processing of the input data frame with respect to a partial processing region of the input data frame that is subsequent to the current partial processing region.

In the case in which the detection result does not indicate the presence of the target data in the input data frame and the current partial processing region is a final partial processing region of the input data frame, the processor may generate an image processing result for the input data frame based on the context data.

Other features and aspects will be apparent from the following detailed description, the drawings, and the claims.

Figure 1:
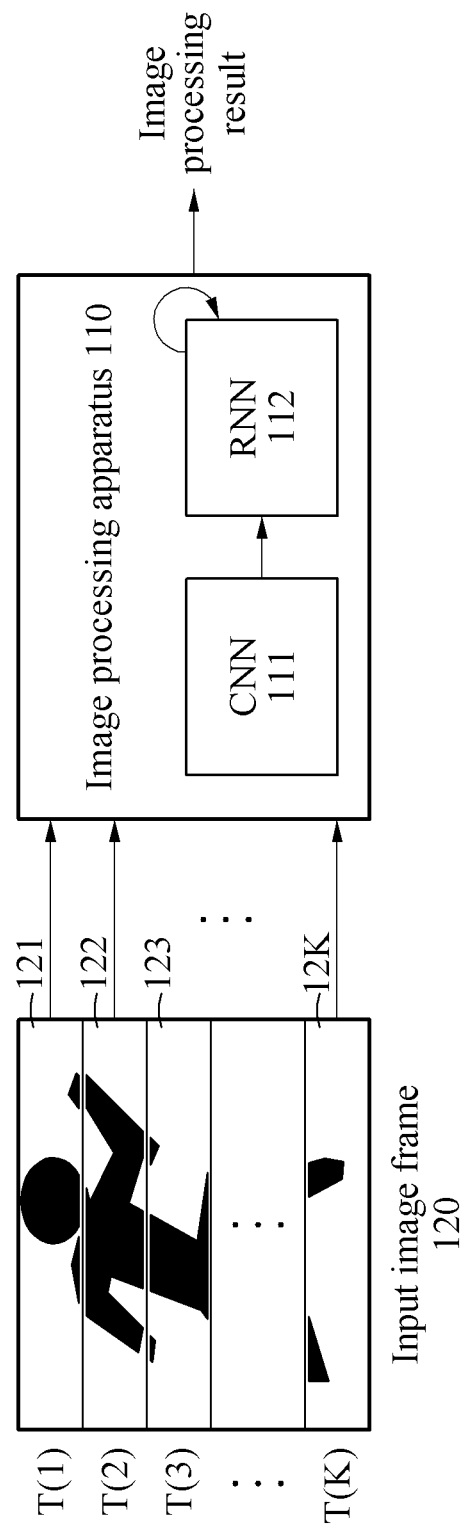
FIG. 1 illustrates an example of an operation of an image processing apparatus.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

Hereinafter, examples will be described in detail with reference to the accompanying drawings. However, various alterations and modifications may be made to the examples. Here, the examples are not construed as limited to the disclosure. The examples should be understood to include all changes, equivalents, and replacements within the idea and the technical scope of the disclosure.

The terminology used herein is for the purpose of describing particular examples only and is not to be limiting of the examples. The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Unless otherwise defined, all terms including technical and scientific terms used herein have the same meaning as commonly understood by one of ordinary skill in the art to which examples belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

When describing the examples with reference to the accompanying drawings, like reference numerals refer to like constituent elements and a repeated description related thereto will be omitted. In the description of examples, detailed description of well-known related structures or functions will be omitted when it is deemed that such description will cause ambiguous interpretation of the present disclosure.

Also, in the description of the components, terms such as first, second, A, B, (a), (b) or the like may be used herein when describing components of the present disclosure. These terms are used only for the purpose of discriminating one constituent element from another constituent element, and the nature, the sequences, or the orders of the constituent elements are not limited by the terms. When one constituent element is described as being "connected", "coupled", or "attached" to another constituent element, it should be understood that one constituent element can be connected or attached directly to another constituent element, and an intervening constituent element can also be "connected", "coupled", or "attached" to the constituent elements.

The same name may be used to describe an element included in the examples described above and an element having a common function. Unless otherwise mentioned, the descriptions on the examples may be applicable to the following examples and thus, duplicated descriptions will be omitted for conciseness.

FIG. 1 illustrates an example of an operation of an image processing apparatus. Referring to FIG. 1, an image processing apparatus 110 performs image processing on an input image frame 120 and outputs an image processing result accordingly. Image processing may include recognition processing on the image frame 120. For example, image processing may include a variety of recognition processing on the image frame 120 that may be processed by an image sensor, such as object detection to determine whether there is an object in the image frame 120 or object classification to determine a class of an object present in the image frame 120. Hereinafter, an example of object detection will be representatively described in relation to image processing. However, the description may also apply to other types of recognition processing.

The input image frame 120 may correspond to one frame of an input image. For example, the input image may include a moving picture (video) and/or a still image, and may be captured in real time by a camera, captured in the past by a camera and stored in a storage, or received from another device through a communication function. The input image frame 120 may be divided into partial processing regions 121 to 12K. Each of the partial processing regions 121 to 12K may correspond to a partial image unit. The image processing apparatus 110 may sequentially process the partial processing regions 121 to 12K of the input image frame 120. For example, the image processing apparatus 110 may process the partial processing region 121 at time T(1), process the partial processing region 122 at time T(2), process the partial processing region 123 at time T(3), and process the partial processing region 12K at time T(K).

The image processing apparatus 110 may include a convolutional neural network (CNN) 111 and a recurrent neural network (RNN) 112. The image processing apparatus 110 may perform recognition process on input data by mapping the input data and output data which are in a non-linear relationship based on deep learning.

Deep learning is a machine learning technique for solving an issue such as image or speech recognition from a big data set. Deep learning is construed as an optimization problem solving process of finding a point at which energy is minimized while training a neural network using prepared training data. Through supervised or unsupervised learning of deep learning, a structure of the neural network or a weight corresponding to a model may be obtained, and the input data and the output data may be mapped to each other through the weight.

The neural network may be trained based on the training data in a training operation, and perform an inference operation such as classification, recognition, or detection related to the input data in an inference operation. The neural network may be pre-trained to perform an operation according to a purpose. Here, "pre" may mean before the neural network is "started". The neural network that is "started" may indicate the neural network is prepared for inference. For example, that the neural network that is "started" may include that the neural network is loaded into a memory, or that input data for inference is input into the neural network after the neural network is loaded into the memory.

The neural network may correspond to a deep neural network (DNN) including a plurality of layers. The plurality of layers includes an input layer, hidden layers, and an output layer. There may be various types of neural networks, such as a fully connected network (FCN), a CNN, an RNN, and the like. A neural network model including the CNN 111 and the RNN 112 may be referred to as an image processing model.

Data input into each layer in the CNN 111 may be referred to as an input feature map, and data output from each layer may be referred to as an output feature map. The input feature map and the output feature map may also be referred to as activation data. In the input layer, the input feature map may correspond to input data.

The RNN 112 may be implemented through a recurrent deep neural network (RDNN) and/or a bidirectional recurrent deep neural network (BRDNN). In general, the RDNN and the BRDNN may be suitable for recognizing continuous data that are determined by the lapse of time, for example, a speech. For example, the RDNN may recognize a current speech frame in consideration of a previous speech frame, and the BRDNN may recognize a current speech frame in consideration of a previous speech frame and a subsequent speech frame. The image processing apparatus 110 may use such characteristics of the RNN 112 to determine a mutual relationship between pixel data of the partial processing regions 121 to 12K.

Recurrent models such as the RNN 112 may have a regression loop. As an output of a recurrent model is input again into the regression model, a new output may be output from the input. For example, the recurrent model may include nodes (or units), and may have a structure in which an output of a node is input again into the node. The recurrent model may include a long short-term memory (LSTM) and/or a gated recurrent unit (GRU). However, the LSTM and the GRU are only examples, and the structure of the recurrent model is not limited thereto.

The image processing apparatus 110 may sequentially process the pixel data of the partial processing regions 121 to 12K using the CNN 111 and the RNN 112. For example, the CNN 111 may serve to extract features from the pixel data of the partial processing regions 121 to 12K, and the RNN 112 may serve to determine a context between the partial processing regions 121 to 12K. The context may include a visual relationship and a geometric relationship between pixels of the partial processing regions 121 to 12K.

For example, the image processing apparatus 110 may extract a feature for the partial processing region 122 by inputting the pixel data of the partial processing region 122 into the CNN 11 at time T(2), and update a hidden state of the RNN 112 by inputting the extracted feature into the RNN 112. The hidden state of the RNN 112 may reflect a context between a partial processing region currently being processed (hereinafter, simply referred to as the current partial processing region) and a partial processing region previously processed (hereinafter, simply referred to as the previous partial processing region). In the example above, the partial processing region 122 corresponds to the current partial processing region. Thus, the hidden state of the RNN 112 may represent a context between the partial processing region 121 and the partial processing region 122.

The image processing apparatus 110 may generate an image processing result based on the hidden state of the RNN 112. A target object may include various objects that may be detected or classified through an image, for example, a person, a human body, a face, an eye, an iris, and the like. Image processing may be object detection to determine whether there is a target object in an input image, and an object detection result may indicate that an object is present in the input image or indicate that an object is absent in the input image.

The image processing apparatus 110 may generate an image processing result after processing all the partial processing regions 121 to 12K. Alternatively, if a partial region clearly shows that an object is present in the input image frame 120, the image processing apparatus 110 may generate the image processing result after processing a portion of the partial processing regions 121 to 12K. For example, if the target object is a face, the image processing apparatus 110 may process the partial processing region 121 and then, generate an image processing result, without processing the other partial processing regions 122 to 12K, since the partial processing region 121 includes a face.

When the operations for image processing are performed for each of the partial processing regions 121 to 12K as described above, a memory may be used for each partial processing region, rather than for the entire frame, and thus, the memory usage may be reduced. For example, a memory to store an input feature map corresponding to the entire frame is required if the entire frame is to be processed, whereas only a memory to store an input feature map corresponding to each partial processing region is required if each partial processing region is to be processed. Even if data other than the input feature map are to be processed for object recognition, the memory usage may be reduced. In addition, since the image processing operations may be started immediately when pixel data of each partial processing region are collected, the latency may be lowered compared to the conventional method that starts the image processing operations when pixel data of the entire frame are collected.

Such image processing may be referred to as partial image unit-based image processing, and may be used in an environment where memory use is limited, for example, in a low power mode. For example, resources available in the low power mode may be limited to resources in a sensor, rather than all the resources of an apparatus equipped with the sensor. Such an environment in which available resources are limited to sensor resources may be referred to as an on-sensor environment.

The low power mode may include an always-on mode. In the always-on mode, a portion of the device screen may be always turned on to provide predetermined information (for example, date, time, simple status information of the device, and the like). For example, power consumption for driving always-on may be limited to about 1 milliwatt (mW), and this power consumption may be as much as maintaining a model and codes of about 40 kilobytes (KB) in a memory. Accordingly, there may be a demand for implementing image processing such as object detection using only memory of about 40 KB while driving always-on. Partial image unit-based image processing according to the example may be used to perform image processing in such a limited environment.

Each partial processing region may include one or more pixel lines. For example, when the size of the input image frame 120 is expressed as W×H, a pixel line may correspond to a vector having a size of W×1.

Image processing may be technically combined with an image signal processing (ISP) algorithm of an image sensor. For example, pixel lines may be sequentially generated through an image signal processing front end (ISP FE), and when a predetermined number of (for example, 5) pixel lines are generated, ISP may be performed on the generated pixel lines. For ease of description, the predetermined number of pixel lines may be referred to as a pixel line group. The ISP FE may perform analog-to-digital conversion (ADC), auto-focus (AF) pixel indication, bed pixel (BP) indication, resolution reduction, signal characteristic correction, and the like. ISP may include bit reduction, BP processing, noise removal, binning, artifact removal, resolution reduction, and the like.

With iteration of a process of forming a pixel line group through the ISP FE and performing ISP on the pixel line group, ISP may be performed on all pixel line groups, and thus, a single image frame may be generated. Frame processing-based image processing may be performed after a single image frame is completed through the ISP algorithm described above. Partial image unit-based image processing may be performed on at least one pixel line (for example, each pixel line group).

Figure 2:
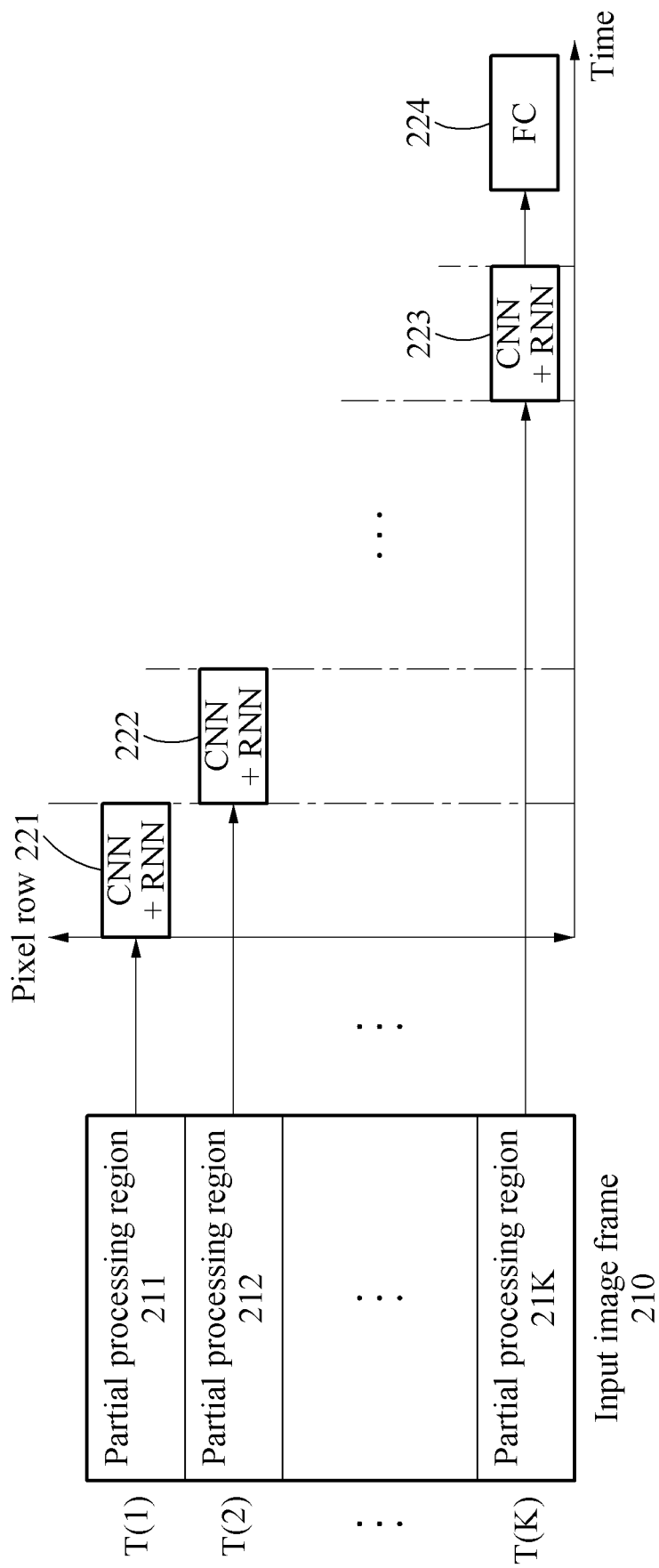
FIG. 2 illustrates an example of time series image processing for each partial image unit.

FIG. 2 illustrates an example of time series image processing for each partial image unit. Referring to FIG. 2, an image processing apparatus processes pixel data of a partial processing region 211 at time T(1). In detail, the image processing apparatus may extract a feature of the partial processing region 211 by inputting the pixel data of the partial processing region 211 into a CNN, and update a hidden state of an RNN by inputting the extracted feature into the RNN.

In the same manner, the image processing apparatus may process pixel data of a partial processing region 212 at time T(2), and process pixel data of a partial processing region 21K at time T(K). Blocks 221, 222, and 223 show a process of processing the pixel data of the partial processing regions 211 to 21K.

The partial processing region 21K corresponds to the last partial processing region of an input image frame 210. Accordingly, the image processing apparatus may generate an image processing result based on a final hidden state updated through the block 223. For example, the image processing apparatus may generate an image processing result by inputting final context data corresponding to the final hidden state into an FCN. A block 224 shows a process of generating the image processing result.

Figure 3:
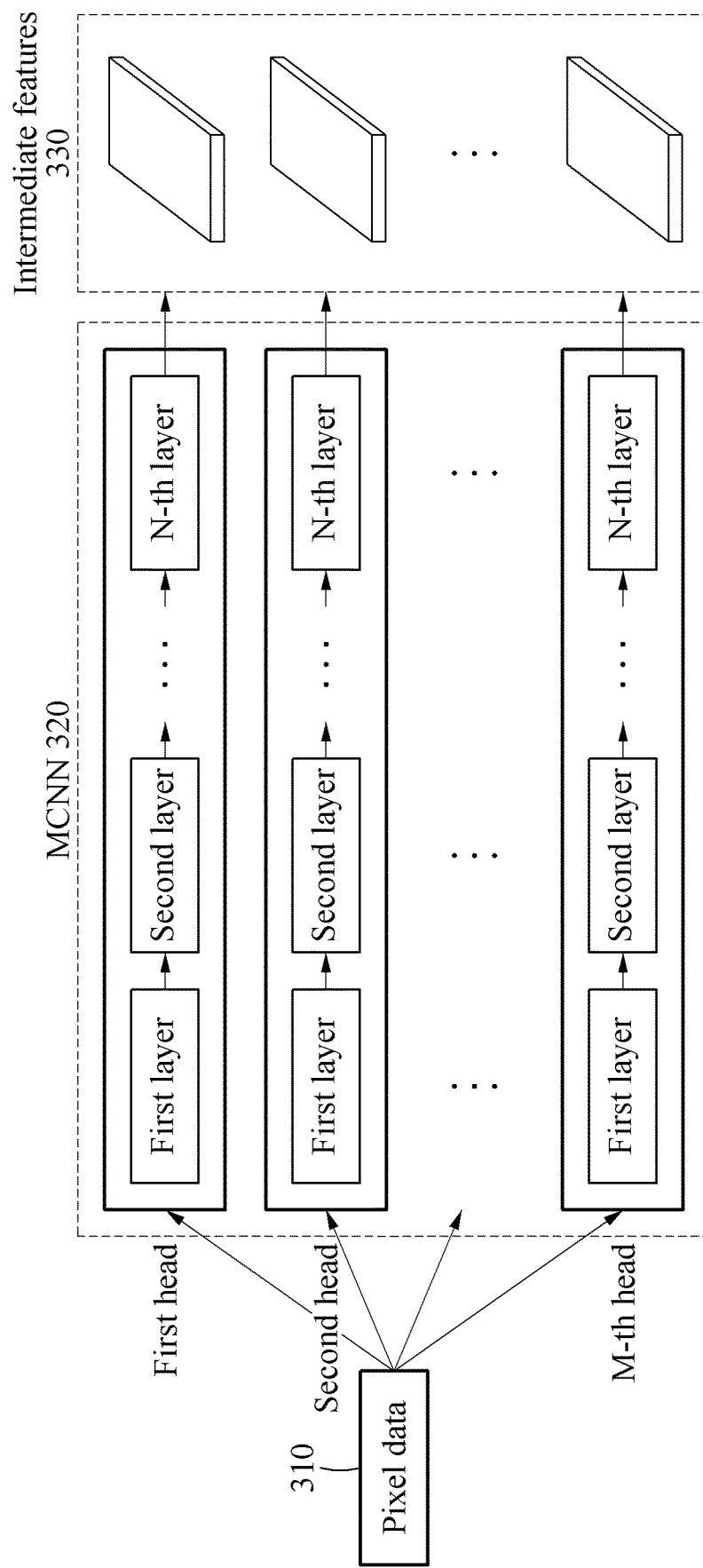
FIG. 3 illustrates an example of generating intermediate features through a multi-head conventional neural network (MCNN).

FIG. 3 illustrates an example of generating intermediate features through a multi-head conventional neural network (MCNN). Referring to FIG. 3, an MCNN 320 includes sub-CNNs corresponding to a plurality of heads. The number of sub-CNNs and the number of heads may be defined as M. Each sub-CNN may include a first layer to an N-th layer, and CNN-related operations such as convolution, pooling, and the like may be performed in each layer. For example, the values of M and N may be determined in view of the system specifications such as memory allowance.

Sub-CNNs may respectively train different network parameters and extract features of input data based on the different network parameters. Thus, even if the same data are input, the sub-CNNs may respectively extract features of different aspects, and there may be diversity among the features extracted by the sub-CNNs.

The image processing apparatus may extract a plurality of intermediate features 330 by inputting pixel data 310 of a current partial processing region into each head of the MCNN 320. The image processing apparatus may generate an encoded feature of the current partial processing region by fusing the intermediate features 330. The process of extracting a feature from each partial processing region as described above may be regarded as an encoding process.

Thus, the feature extracted from each partial processing region may be referred to as an encoded feature.

Figure 4:
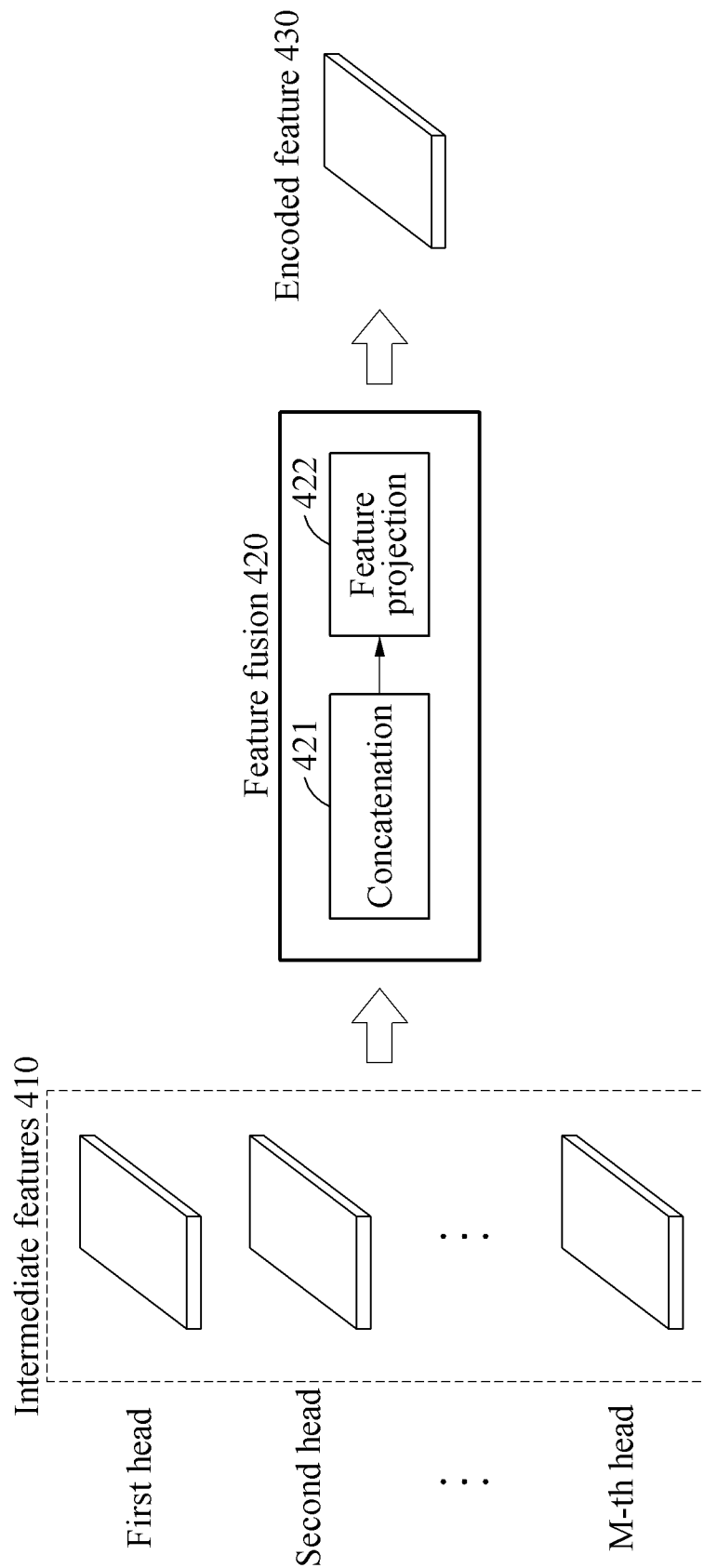
FIG. 4 illustrates an example of generating an encoded feature by fusing intermediate features.

FIG. 4 illustrates an example of generating an encoded feature by fusing intermediate features. Referring to FIG. 4, an image processing apparatus may generate an encoded feature 430 by fusing intermediate features 410. A block 420 shows a feature fusion process, and feature fusion may include a concatenation process 421 and a feature projection process 422. Feature projection may include a convolution operation and may be performed based on the direction of concatenation. For example, if the intermediate features 410 are concatenated in a channel direction, feature investigation may be performed so that the size may be reduced in the channel direction. As a result of concatenation and feature projection, the size of the encoded feature 430 and the size of each of the intermediate features 410 may be the same.

Figure 5:
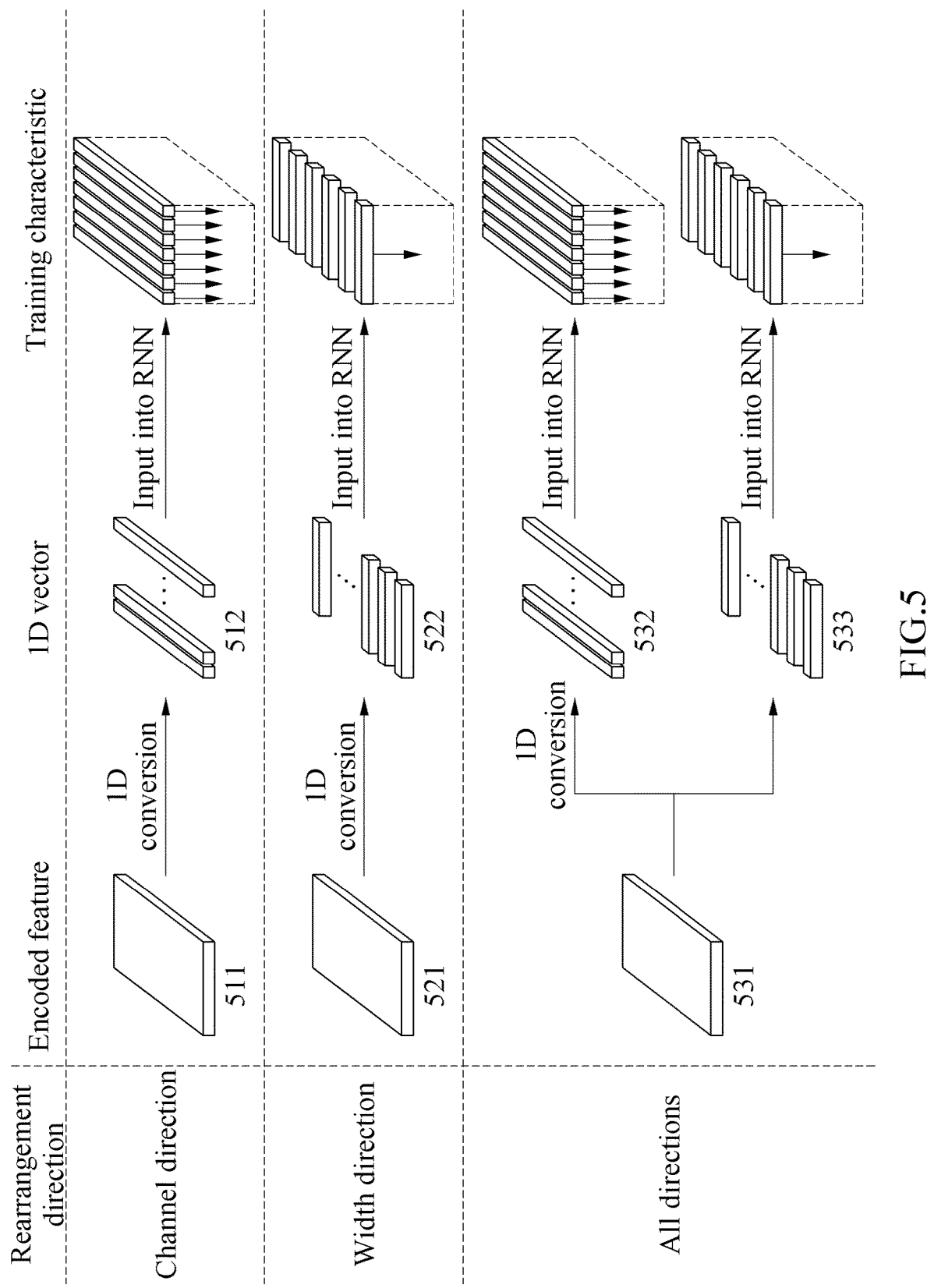
FIG. 5 illustrates an example of rearranging encoded features.

FIG. 5 illustrates an example of rearranging encoded features. As described above, an image processing apparatus may extract a feature from pixel data of each partial processing region and input the extracted feature into an RNN. In this example, the extracted feature may be converted into a one-dimensional (1D) vector and then input into the RNN. This conversion process may be referred to as rearrangement or reshape. A memory may be saved by using a 1D vector-based RNN, rather than using a multi-dimensional (2D or 3D) vector-based RNN.

Referring to FIG. 5, it may be seen that training characteristics vary according to a rearrangement direction. For example, if an encoded feature 511 is converted into a 1D channel direction vector 512 and input into an RNN, the RNN may reflect a context in a channel vector direction. If an encoded feature 521 is converted into a 1D width direction vector 522 and input into an RNN, the RNN may reflect a context in a width vector direction. If an encoded feature 531 is converted into a 1D channel direction vector 532 and a 1D width direction vector 533 and input into an RNN, the RNN may reflect a context in both directions, that is, in the channel direction and in the width direction. If both directions are to be considered as described above, more memory may be required than a case of considering any one direction.

Figure 6:
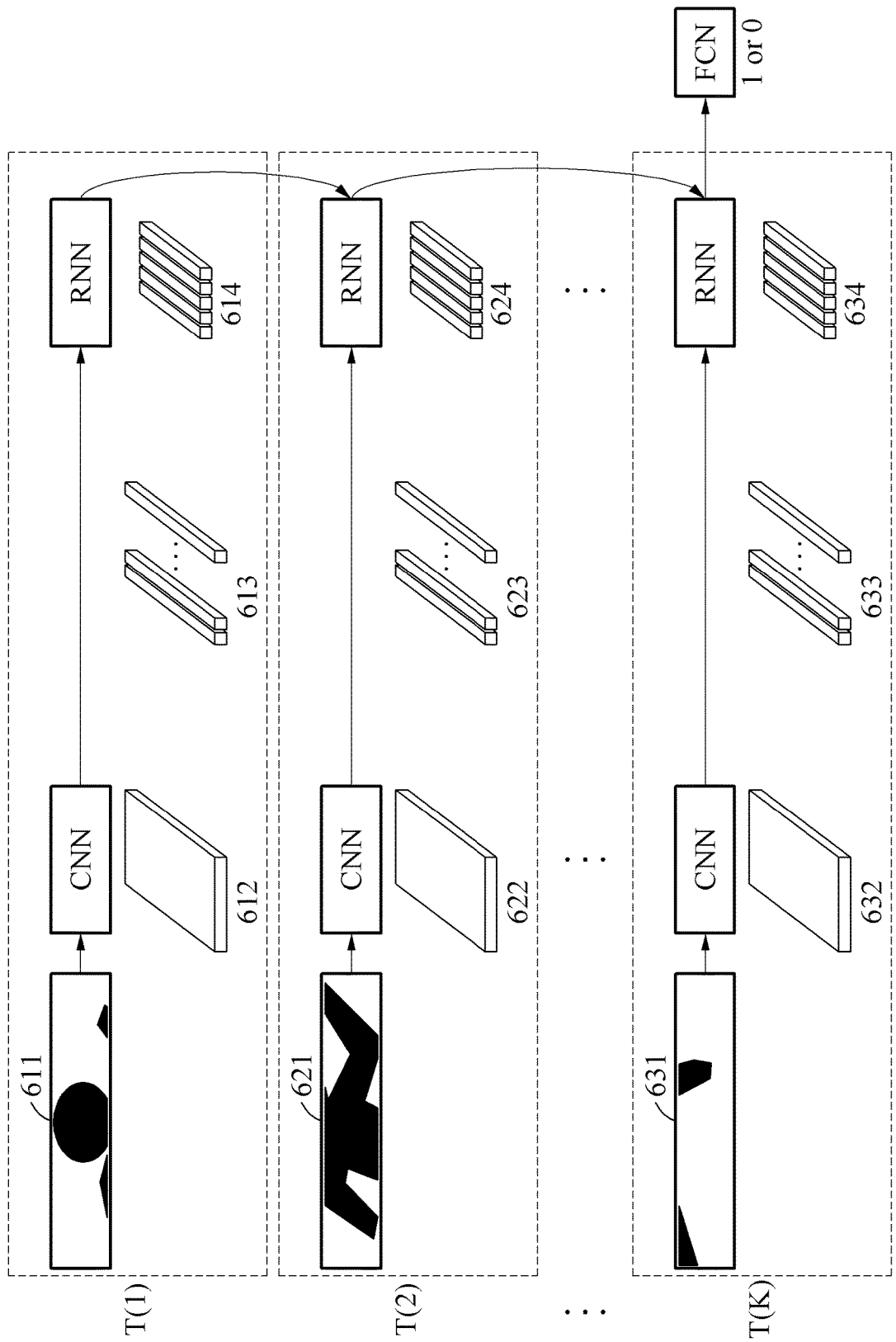
FIG. 6 illustrates an example of generating an image processing result through an object detection process.

FIG. 6 illustrates an example of generating an image processing result through an object detection process. Referring to FIG. 6, at time T(1), an image processing apparatus extracts a feature 612 of a first partial processing region by inputting pixel data 611 of the first partial processing region into a CNN, and updates a hidden state of an RNN by converting the feature 612 into a 1D vector 613 and inputting the 1D vector 613 into the RNN. The feature 612 may correspond to an encoded feature, and a hidden vector 614 may correspond to the hidden state of the RNN updated at time T(1). In the example of FIG. 6, the feature 612 is rearranged in a channel direction, but may also be rearranged in other directions.

At time T(2), the image processing apparatus may extract a feature 622 of a second partial processing region by inputting pixel data 621 of the second partial processing region into a CNN, and update a hidden vector 624 corresponding to a hidden state of an RNN by converting the feature 622 into a 1D vector 623 and inputting the 1D vector 623 into the RNN. A hidden state of an RNN may be updated based on input data and a hidden state at a previous time. For example, the hidden state at time T(2) may be updated based on the 1D vector 623 and the hidden state at time T(1). A hidden state at a previous time for time T(1) is "0". Thus, the hidden state at time T(1) may be regarded as being updated based on the 1D vector 613 and a zero state.

At time T(K), the image processing apparatus may extract a feature 632 of a K-th partial processing region by inputting pixel data 631 of the K-th partial processing region into a CNN, and update a hidden vector 634 corresponding to a hidden state of an RNN by converting the feature 632 into a 1D vector 633 and inputting the 1D vector 633 into the RNN. If the current partial processing region corresponds to a last partial processing region of the input image frame, the image processing apparatus may generate final context data based on the final hidden state. In the example of FIG. 6, the K-th partial processing region corresponds to the last partial processing region. Thus, the image processing apparatus may generate the hidden vector 634 corresponding to the final hidden state updated at time T(K). The hidden vector 634 corresponds to the final context data.

The image processing apparatus may generate an image processing result based on the final context data. For example, the image processing apparatus may input the final context data into an FCN and generate the image processing result based on an output from the FCN. The image processing apparatus may appropriately transform, for example, flatten, the final context data, and then input the transformed context data into the FCN.

If image processing includes object detection, a class "1" may indicate that an object is present in an input image, and a class "0" may indicate that an object is absent in the input image. The FCN may include an output value of a node for indicating a probability of the class "1" and an output value of a node for indicating a probability of the class "0", and may output a class having a higher probability value as the image processing result. For example, if the probability value of the class "1" is greater than the probability value of the class "0", an image processing result indicating that an object is present in the input image may be output.

As another example, if image processing includes object classification, a class "1" may indicate that a first object (for example, cat) is present in an input image, and a class "0" may indicate that a second object (for example, dog) is present in the input image. For example, if a probability value of the class "1" is greater than a probability value of the class "0", an image processing result indicating that the first object (for example, cat) is present in the input image may be output. A larger number of classes may be defined for object classification than object detection.

Figure 7:
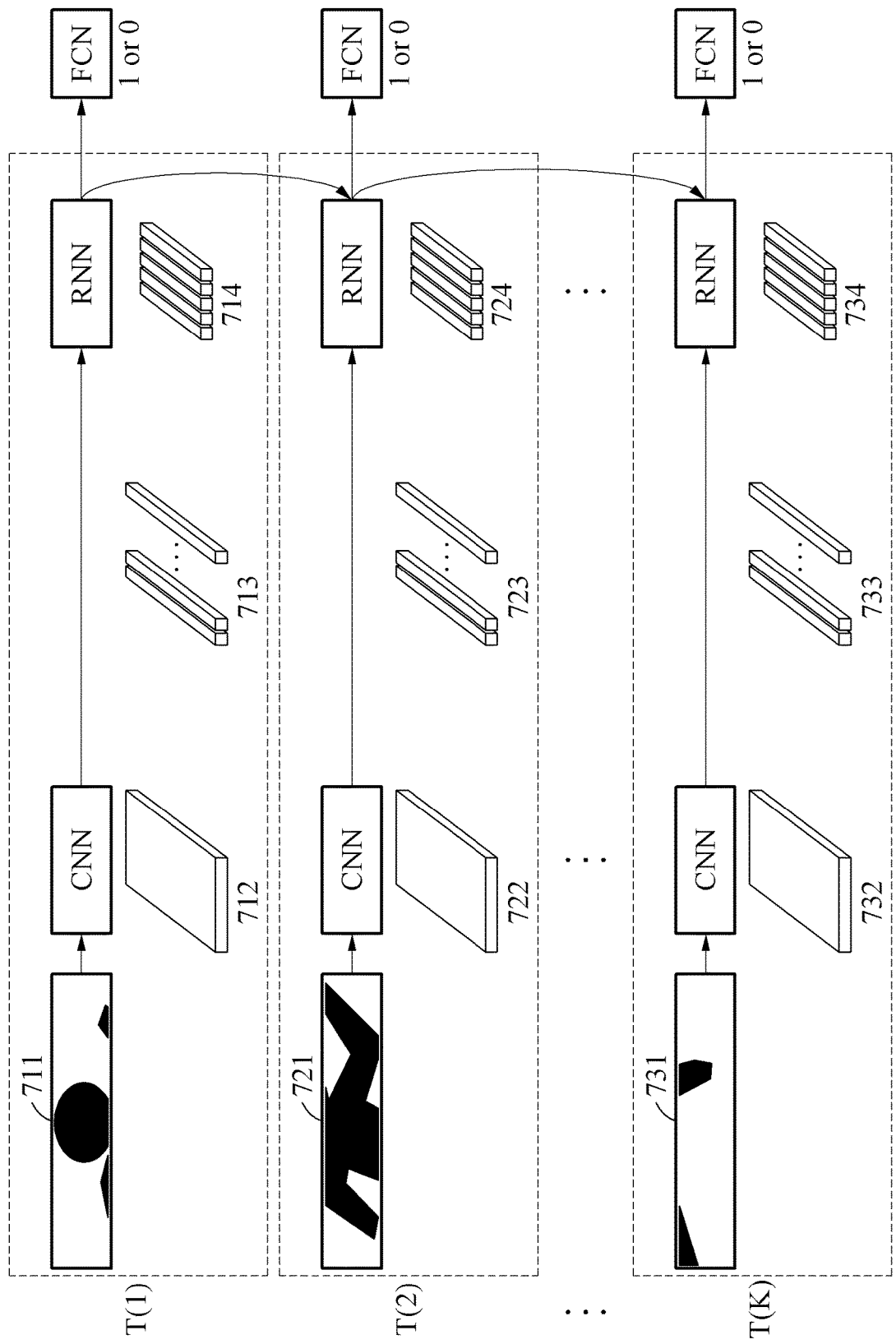
FIG. 7 illustrates an example of generating an intermediate detection result through an object detection process.

FIG. 7 illustrates an example of generating an intermediate detection result through an object detection process. Unlike the example of FIG. 6, an intermediate detection result may be generated before a last partial processing region is processed in the example of FIG. 7. In detail, at time T(1), an image processing apparatus extracts a feature 712 by inputting pixel data 711 of a first partial processing region into a CNN, and updates a hidden state of an RNN by converting the feature 712 into a 1D vector 713 and inputting the 1D vector 713 into the RNN.

The image processing apparatus may generate intermediate context data from a hidden vector 714 corresponding to the updated hidden state, and generate an intermediate detection result by inputting the intermediate context data into an FCN. The intermediate detection result may indicate whether a target object is present in an input image and be determined based on the intermediate context data. For object classification, an intermediate classification result indicating the class of an object present in the input image may be generated.

If the intermediate detection result shows that a target object is present in an input image frame, an object detection process on the input image frame may be terminated without performing an additional object detection process on a subsequent partial processing region. That is because if a portion of partial processing regions shows that there is an object in the input image frame, it may be unnecessary to analyze the remaining partial processing regions. If an object is detected through the intermediate detection result as described above, the time taken for object detection may be reduced.

If the intermediate detection result does not show that a target object is present in the input image frame, a subsequent partial processing region may be processed. In detail, at time T(2), the image processing apparatus may extract a feature 722 by inputting pixel data 721 of a second partial processing region into a CNN, and update a hidden state of an RNN by converting the feature 722 into a 1D vector 723 and inputting the 1D vector 723 into the RNN. An FCN may receive a hidden vector 724 corresponding to intermediate context data and generate an intermediate detection result. If the intermediate detection result shows that a target object is present in the input image frame, an object detection process on the input image frame may be terminated. If the intermediate detection result does not show that a target object is present in the input image frame, a subsequent partial processing region may be processed.

This process may be repeated until time T(K). If intermediate detection results up to time T(K−1) do not show that a target object is present in the input image frame, a K-th partial processing region at time T(K) may be processed. The K-th partial processing region at time T(K) may be processed in the same manner as in the example of FIG. 6. In detail, the image processing apparatus may extract a feature 732 by inputting pixel data 731 of the K-th partial processing region into a CNN, and update a hidden state of an RNN by converting the feature 732 into a 1D vector 733 and inputting the 1D vector 733 into the RNN. The image processing apparatus may generate final context data from a hidden vector 734 corresponding to the hidden state updated at time T(K), and generate an image processing result by inputting the final context data into an FCN.

Figure 8:
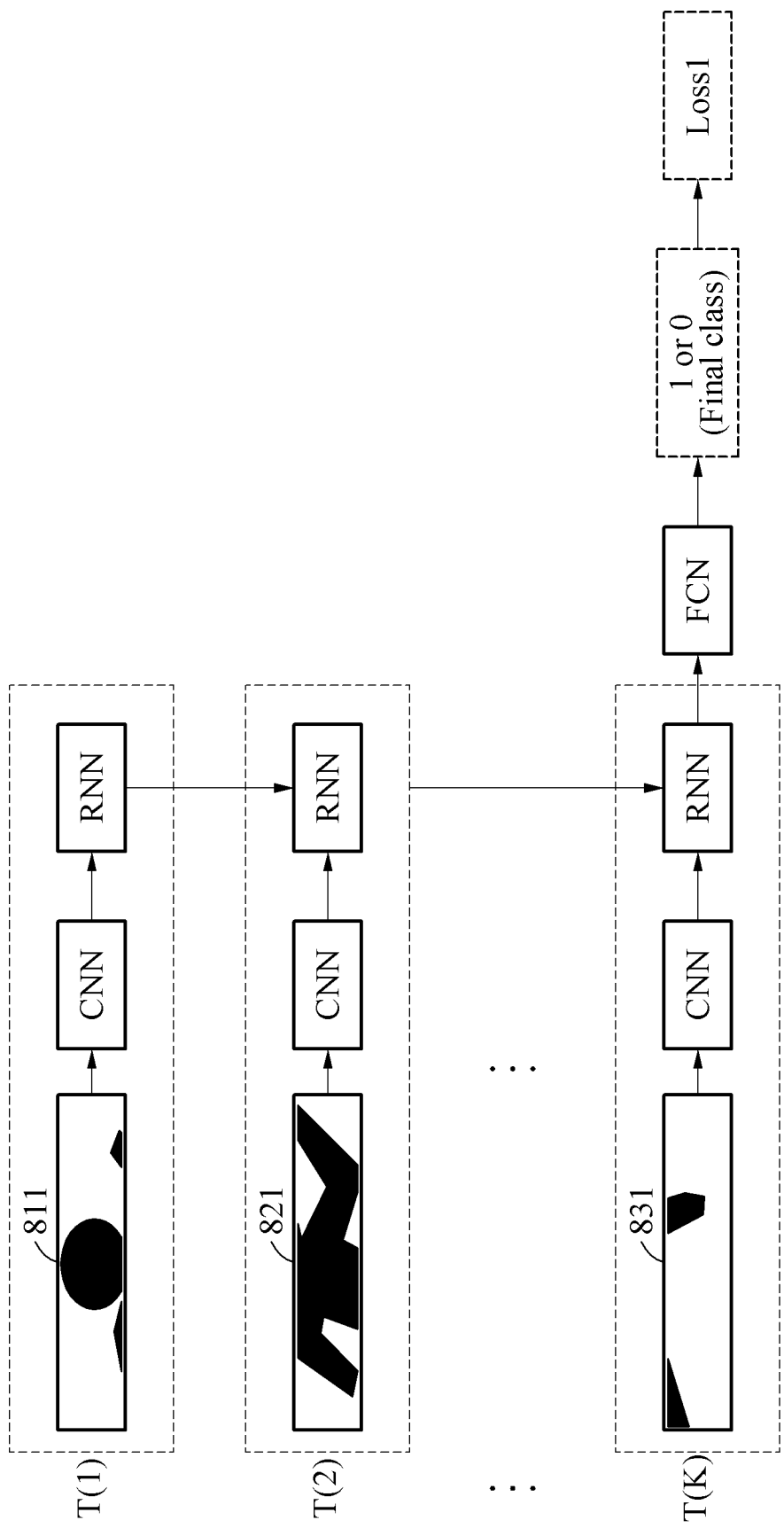
FIG. 8 illustrates an example of training an object detection model.

FIG. 8 illustrates an example of training an object detection model. A neural network model may be referred to as an image processing model in the sense of performing image processing, and may also be referred to as an object detection model in the sense of performing object detection. Hereinafter, an object detection model will be representatively described in relation to the image processing model. However, the description may also apply to various other models such as an object classification model.

An object detection model may include CNNs, RNNs, and an FCN, as shown in FIG. 8. For example, the object detection model may be training based on training data in a supervised manner. The training data may include training images and labels. The training images may be various images including or not including a target object to be detected, and the labels may each indicate whether the target object to be detected is present in a corresponding training image.

Referring to FIG. 8, a final class "1" or "0" may be output when pixel data 811, 821, and 831 are processed at times T(1), T(2), . . . , T(K) through the CNNs, the RNNs, and the FCN. The final class "1" may indicate that an object is present in a training image, and the final class "0" may indicate that an object is absent in a training image. The object detection model may be trained to output a final class indicated by a label in this way. As described above, a larger number of classes may be defined for object classification.

The object detection model may be trained based on a final loss-based loss function Loss1. For example, the loss function Loss1 may be expressed by Equation 1.

$$Loss1 = Final\_Loss \quad \text{[Equation 1]}$$

In Equation 1, Final_Loss denotes a difference between the final class and the label. An output from the FCN may include a probability value of a final class "1" and a probability value of a final class "0", and Final_Loss may be determined based on a difference between each output value and a label. The object detection model may be trained to minimize this loss function Loss1. For example, image processing of FIG. 6 may be performed based on the object detection model trained through the example of FIG. 8.

Figure 9:
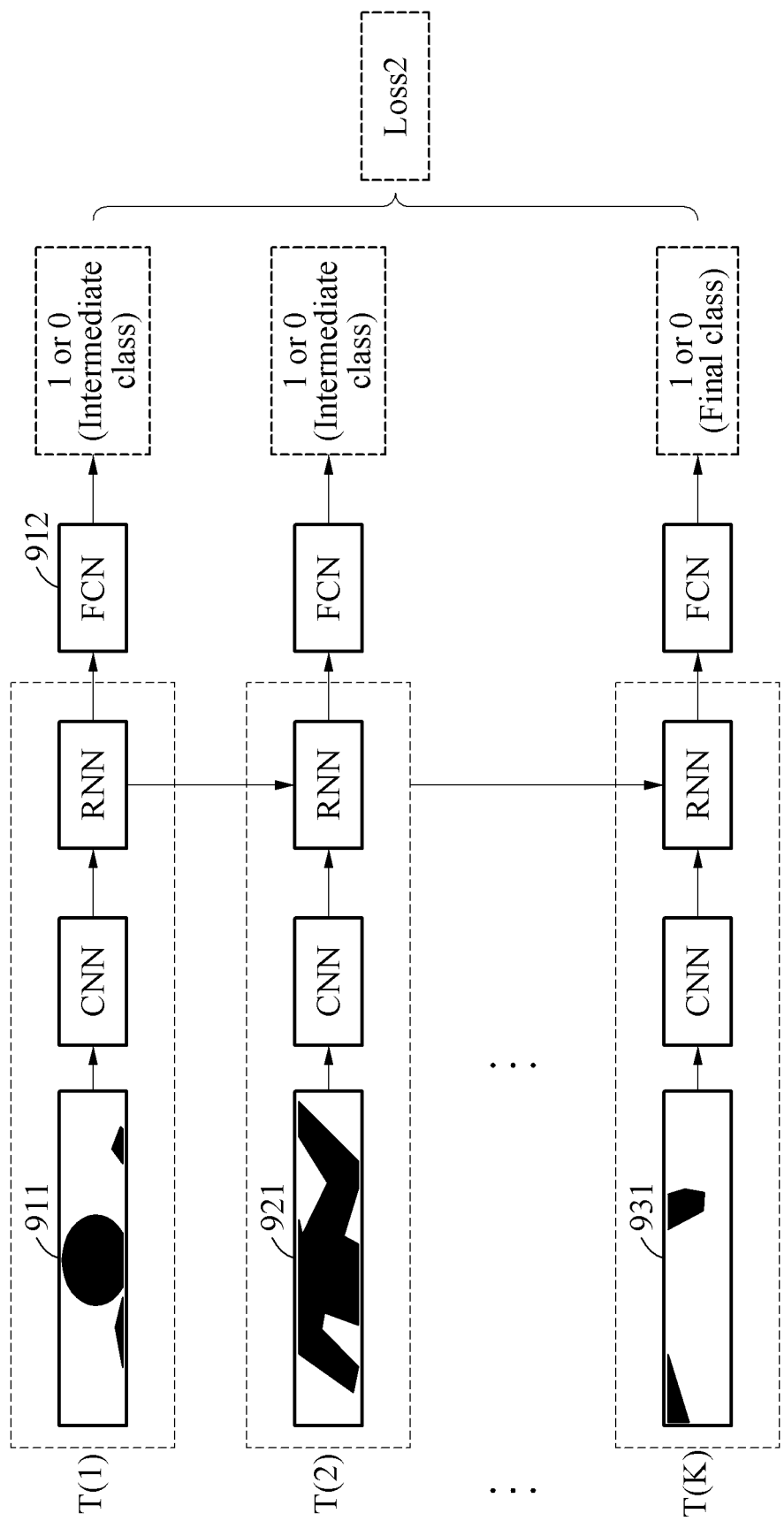
FIG. 9 illustrates an example of training an object detection model.

FIG. 9 illustrates an example of training an object detection model. Referring to FIG. 9, an image processing model has a structure for outputting an intermediate class. Intermediate classes may be output when pixel data 911 and 921 are processed at times T(1) and T(2) through CNNs, RNNs, and FCNs. In addition, a final class may be output when pixel data 931 are processed at time T(K) through a CNN, an RNN, and an FCN. The image processing model may be trained based on an intermediate class-based loss function Loss2. For example, the loss function Loss2 may be expressed by Equation 2.

$$Loss2 = Final\_Loss + \alpha \Sigma Inter\_Loss \quad \text{[Equation 2]}$$

In Equation 2, Final_Loss denotes a difference between a final class and a final label, and Inter_Loss denotes a difference between an intermediate class and an intermediate label. For example, the process of calculating Final_Loss described through Equation 1 may apply to the calculation of Final_Loss and Inter_Loss in Equation 2. α denotes a weight related to Inter_Loss, and α may be set to a value less than "1". The object detection model may be trained to minimize this loss function Loss2. For example, image processing of FIG. 7 may be performed based on the object detection model trained through the example of FIG. 9.

According to the example of FIG. 9, training data may include a final label and intermediate labels as labels of each training image. The intermediate labels may be for comparison with respective intermediate classes and may indicate whether it is possible to determine the presence of an object with a current context. The final label may indicate whether an object is present in the corresponding training image. For example, when a target object is present in a first partial processing region of a training image, a first intermediate label may indicate an intermediate class "1". The first intermediate label may be an intermediate label corresponding to the pixel data 911 of the first partial processing region, and the FCN 912 may perform intermediate detection on the pixel data 911. The FCN 912 may include an output value of a node indicating a probability of an intermediate class "1" and an output value of a node indicating a probability of an intermediate class "0". In this case, the first intermediate label indicating the intermediate class "1" may have a label value of "1" corresponding to the output value of the node indicating the probability of the intermediate class "1" of the FCN 912, and a label value of "0" corresponding to the output value of the node indicating the probability of the intermediate class "0" of the FCN 912.

As another example, if a target object is present across the first partial processing region and the second partial processing region of the training image, the first intermediate label or the second intermediate label may indicate an intermediate class "1". If it is highly likely to determine that a target object is present in the training image through the first partial processing region, the first intermediate label may indicate "1". Conversely, if both the first partial processing region and the second partial processing region need to be checked to determine that a target object is present in the training image, the first intermediate label may indicate "0" and the second intermediate label may indicate "1".

Figure 10:
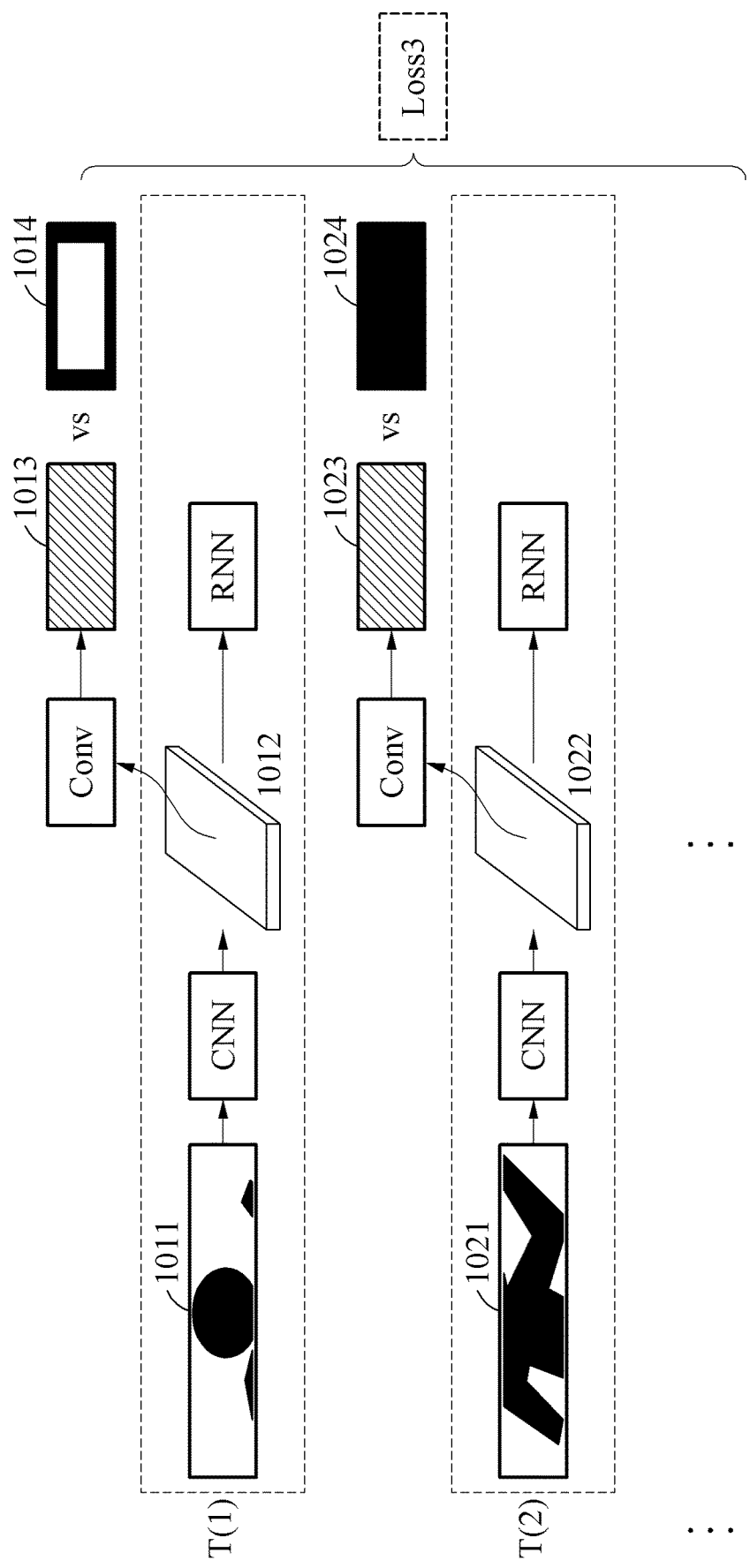
FIG. 10 illustrates an example of training an object detection model.

FIG. 10 illustrates an example of training an object detection model. Referring to FIG. 10, an object detection model includes a training structure for improving the feature extraction performance of CNNs. For example, a feature 1012 extracted from pixel data 1011 through a CNN at time T(1) is input into an RNN to update a hidden state of the RNN. In this process, the feature 1012 is transformed into another feature 1013 through a convolution block Conv. The obtained feature 1013 and a masked label 1014 may have the same dimension. The feature 1013 may be compared to the masked label 1014, and a difference therebetween may be used for training the object detection model. Similarly, a feature 1012 extracted from pixel data 1021 at time T(2) may also be transformed into a feature 1023 and compared to a masked label 1024.

Each of the masked labels 1014 and 1024 may include object position information. The object position information may indicate the position of an object in each partial processing region of a training image frame. For example, in the masked label 1014, a white region may be a region in which an object is present, and a black region may be a region in which an object is absent. Since the masked label 1014 includes a white region and the masked label 1024 does not, it may be seen that an object is present at the center of the first partial processing region in the training image used for the example of FIG. 10.

The object detection model may be trained to extract features from the training image based on the object position information in the masked labels 1014 and 1024. In detail, the object detection model may be trained to generate a result indicating that an object is present in a partial processing region and/or frame that is determined to include the object based on the object position information. For example, when the object detection model is trained through the masked labels 1014 and 1024, feature extraction for the center of the first partial processing region may be enhanced.

The object detection model may be trained based on an object position information-based loss function Loss3. For example, the loss function Loss3 may be expressed by Equation 3.

$$Loss3 = Final\_Loss + \alpha \Sigma Inter\_Loss + \beta \Sigma CNN\_Loss \quad [\text{Equation 3}]$$

In Equation 3, Final_Loss denotes a difference between a final class and a final label, Inter_Loss denotes a difference between an intermediate class and an intermediate label, and CNN_Loss denotes a difference between a deformed feature and a masked label. α denotes a weight related to Inter_Loss, and β denotes a weight related to CNN_Loss. α may be set to a value less than "1", and β may be set to a value less than α. Since the coefficient of Final_Loss is 1, when α is less than 1, Inter_Loss has less effect than Final_Loss to adjust weights. When β is less than α, CNN_Loss has less effect than Inter_Loss to adjust weights. Setting α less than 1 and β less than α may have the greatest effect of Final_Loss. However, α and β may be set to different values and/or ranges according to design intention.

Figure 11:
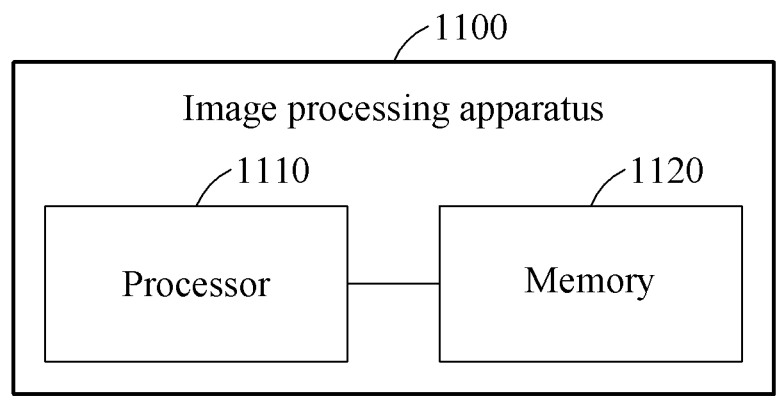
FIG. 11 illustrates an example of a configuration of an image processing apparatus.

FIG. 11 illustrates an example of a configuration of an image processing apparatus. Referring to FIG. 11, an image processing apparatus 1100 includes a processor 1110 and a memory 1120. The memory 1120 is connected to the processor 1110, and stores instructions executable by the processor 1110, data to be calculated by the processor 1110, or data processed by the processor 1110. The memory 1120 includes a non-transitory computer readable medium, for example, a high-speed random access memory, and/or a non-volatile computer readable storage medium, for example, at least one disk storage device, flash memory device, or other non-volatile solid state memory devices.

The processor 1110 executes instructions to perform the at least one operation described with reference to FIGS. 1 through 10. For example, the processor 1110 may extract a feature of a current partial processing region of an input image frame by inputting pixel data of the current partial processing region into a CNN, update a hidden state of an RNN for a context between the current partial processing region and a previous partial processing region by inputting the extracted feature into the RNN, and generate an image processing result for the input image frame based on the updated hidden state. In addition, the description provided with reference to FIGS. 1 to 10 may apply to the image processing apparatus 1100.

Figure 12:
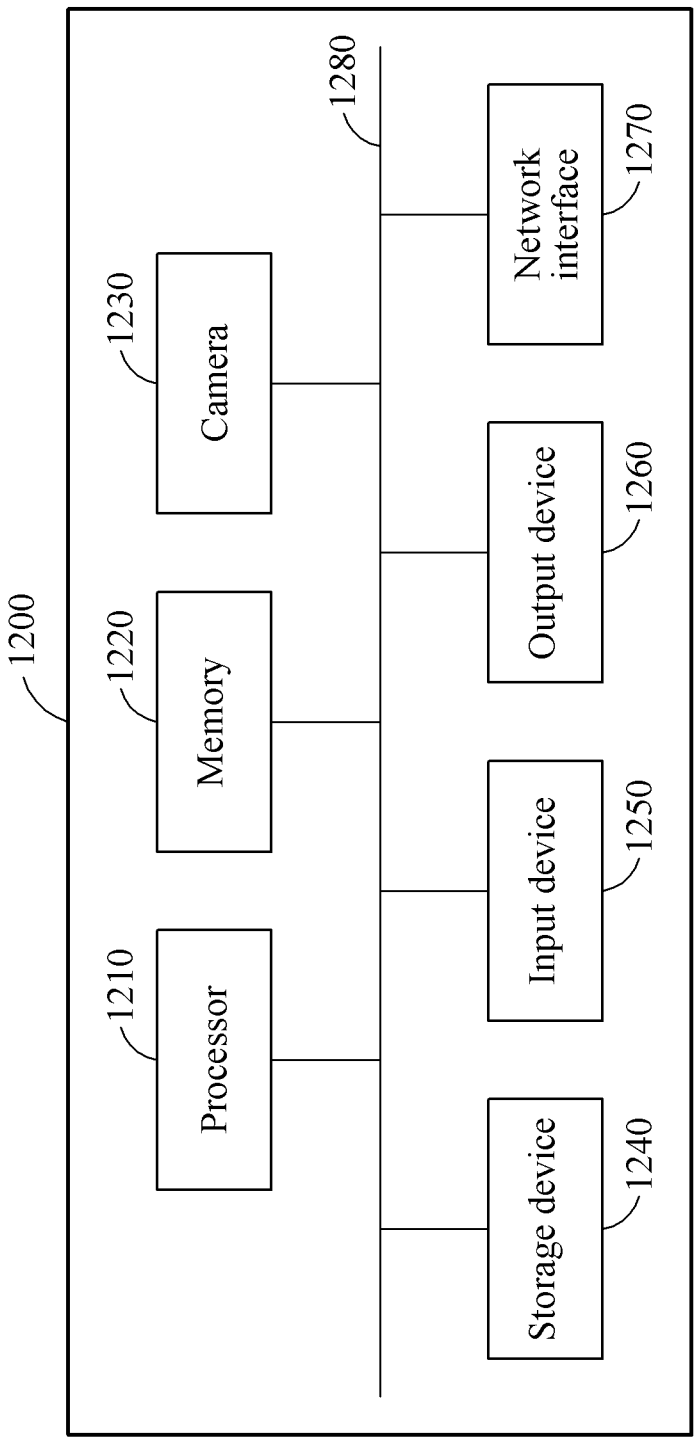
FIG. 12 illustrates an example of a configuration of an electronic device.

FIG. 12 illustrates an example of a configuration of an electronic device. Referring to FIG. 12, an electronic device 1200 may acquire an input image and detect a target object in the acquired input image. Further, the electronic device 1200 may perform various operations associated with object detection, for example, object tracking, object recognition, and unlocking. For example, the electronic device 1200 may perform object detection (for example, face detection) in a low power mode in which power consumption is limited to 1 mW or less, such as an always-on mode, and be woken up in response to object detection to perform an operation associated with object detection in a normal mode. The electronic device 1200 may structurally and/or functionally include the image processing apparatus 100 of FIG. 1.

The electronic device 1200 may include a processor 1210, a memory 1220, a camera 1230, a storage device 1240, an input device 1250, an output device 1260, and a network interface 1270 that may communicate with each other through a communication bus 1280. For example, the electronic device 1200 may be implemented as a part of a mobile device such as a mobile phone, a smart phone, a PDA, a netbook, a tablet computer or a laptop computer, a wearable device such as a smart watch, a smart band or smart glasses, a computing device such as a desktop or a server, a home appliance such as a television, a smart television or a refrigerator, a security device such as a door lock, or a vehicle such as a smart vehicle.

The processor 1210 executes instructions or functions to be executed in the electronic device 1200. For example, the processor 1210 may process the instructions stored in the memory 1220 or the storage device 1240. The processor 1210 may perform the operations described through FIGS. 1 to 11.

The memory 1220 stores data for object detection. The memory 1220 may include a computer-readable storage medium or a computer-readable storage device. The memory 1220 may store instructions to be executed by the processor 1210 and may store related information while software and/or an application is executed by the electronic device 1200.

The camera 1230 may capture a photo and/or a video. For example, the camera 1230 may capture a body image including a user and/or a face image including the face of a user. The photo and/or the video captured by the camera 1230 may be used as an input image. The camera 1230 may provide a 3D image including depth information related to objects.

The storage device 1240 includes a computer-readable storage medium or computer-readable storage device. The storage device 1240 may store a variety of data to be used in the object detection process, such as an object detector and a threshold determination engine. The storage device 1240 may store a more quantity of information than the memory 1220 for a long time. For example, the storage device 1240 may include a magnetic hard disk, an optical disk, a flash memory, a floppy disk, or other non-volatile memories known in the art.

The input device 1250 may receive an input from the user in traditional input manners through a keyboard and a mouse, and in new input manners such as a touch input, a voice input, and an image input. For example, the input device 1250 may include a keyboard, a mouse, a touch screen, a microphone, or any other device that detects the input from the user and transmits the detected input to the electronic device 1200.

The output device 1260 may provide an output of the electronic device 1200 to the user through a visual, auditory, or tactile channel. The output device 1260 may include, for example, a display, a touch screen, a speaker, a vibration generator, or any other device that provides the output to the user. The network interface 1270 may communicate with an external device through a wired or wireless network.

Figure 13:
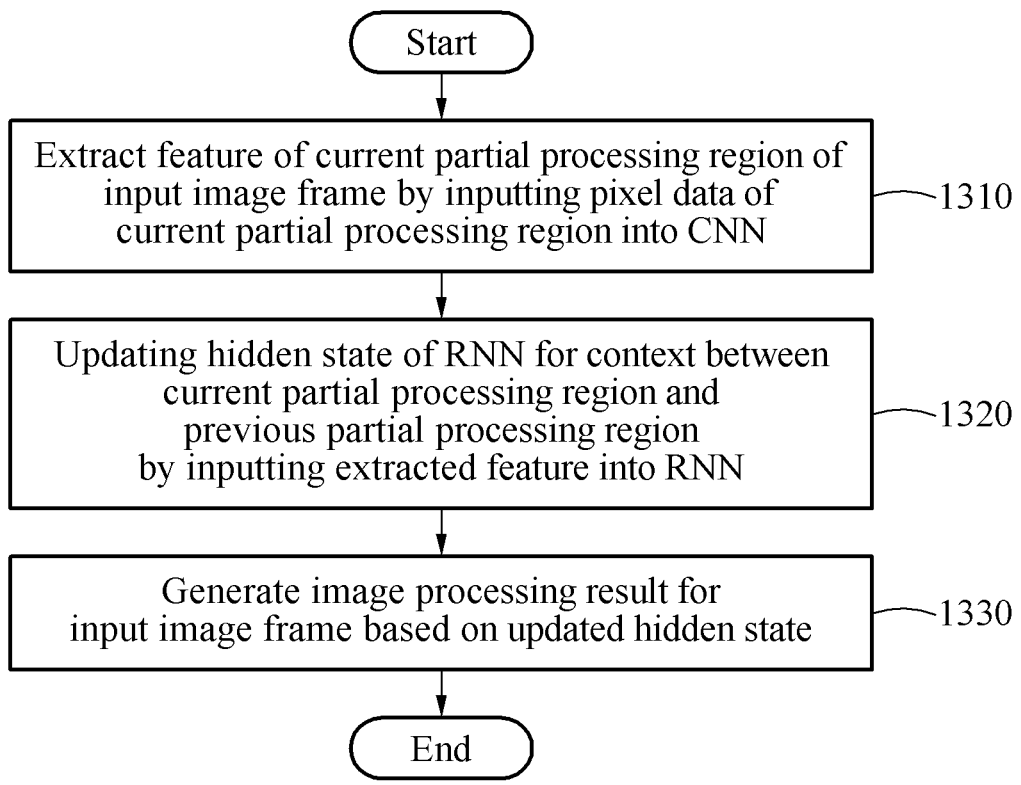
FIG. 13 illustrates an example of an image processing method.

FIG. 13 illustrates an example of an image processing method. Referring to FIG. 13, in operation 1310, an image processing apparatus extracts a feature of a current partial processing region of an input image frame by inputting pixel data of the current partial processing region into a CNN. In operation 1320, the image processing apparatus updates a hidden state of an RNN for a context between the current partial processing region and a previous partial processing region by inputting the extracted feature into the RNN. In operation 1330, the image processing apparatus generates an image processing result for the input image frame based on the updated hidden state. In addition, the description provided with reference to FIGS. 1 to 12 may apply to the object detection method.

The methods according to the above-described examples may be recorded in non-transitory computer-readable media including program instructions to implement various operations of the above-described examples. The media may also include, alone or in combination with the program instructions, data files, data structures, and the like. The program instructions recorded on the media may be those specially designed and constructed for the purposes of examples, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher-level code that may be executed by the computer using an interpreter. The above-described devices may be configured to act as one or more software modules in order to perform the operations of the above-described examples, or vice versa.

The software may include a computer program, a piece of code, an instruction, or one or more combinations thereof, to independently or uniformly instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network-coupled computer systems so that the software is stored and executed in a distributed fashion. The software and data may be stored by one or more non-transitory computer-readable recording mediums.

A number of examples have been described above. Nevertheless, it should be understood that various modifications may be made to these examples. For example, suitable results may be achieved if the described techniques are performed in a different order and/or if components in a described system, architecture, device, or circuit are combined in a different manner and/or replaced or supplemented by other components or their equivalents.

Accordingly, other implementations are within the scope of the following claims.

The apparatuses, units, modules, devices, and other components described herein are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and providing the instructions or software and any associated data, data files, and data structures to a processor or computer so that the processor or computer can execute the instructions.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A method of processing an image, the method comprising:
    extracting a feature of a current partial processing region of an input image frame by inputting pixel data of the current partial processing region into a convolutional neural network (CNN) being a multi-head CNN (MCNN);
    updating a hidden state of a recurrent neural network (RNN) for a context between the current partial processing region and at least one previous partial processing region of the input image frame by inputting the extracted feature into the RNN; and
    generating an image processing result for the input image frame based on the updated hidden state,
    wherein the extracting comprises extracting a plurality of intermediate features of the current partial processing region by inputting the pixel data of the current partial processing region into each of plural heads of the MCNN, and
    generating an encoded feature of the current partial processing region by fusing the plurality of extracted intermediate features.

2. The method of claim 1, wherein the updating comprises converting the extracted feature to a one-dimensional vector and inputting the one-dimensional vector into the RNN.

3. The method of claim 2, wherein the one-dimensional vector comprises at least one of a channel direction vector and a width direction vector.

4. The method of claim 1, wherein the generating comprises:
    generating final context data based on the updated hidden state in response to the current partial processing region corresponding to a final partial processing region of the input image frame; and
    generating the image processing result based on the final context data.

5. The method of claim 1, wherein the image processing result indicates whether there is a target object in the input image frame.

6. The method of claim 5, wherein the target object is a human.

7. The method of claim 5, wherein the target object is a human face.

8. The method of claim 1, wherein the generating comprises:

generating intermediate context data based on the updated hidden state in response to the current partial processing region not corresponding to a final partial processing region of the input image frame; and generating an intermediate detection result based on the intermediate context data.

9. The method of claim 1, wherein each partial processing region including the current partial processing region corresponds to a pixel line group for image signal processing (ISP) of an image sensor.

10. The method of claim 1, wherein the extracting, the updating, and the generating are performed in a low power mode.

11. The method of claim 1, wherein the CNN is trained in advance using object position information related to each partial processing region of a training image frame.

12. The method of claim 1, wherein the updated hidden state represents a hidden vector corresponding to the context.

13. A non-transitory computer-readable storage medium storing instructions that, when executed by a processor, cause the processor to perform the method of claim 1.

14. A method of processing an image, the method comprising:
extracting a feature of a current partial processing region of an input image frame by inputting pixel data of the current partial processing region into a convolutional neural network (CNN);
updating a hidden state of a recurrent neural network (RNN) for a context between the current partial processing region and at least one previous partial processing region of the input image frame by inputting the extracted feature into the RNN; and
generating an image processing result for the input image frame based on the updated hidden state,
wherein the generating comprises:
generating intermediate context data based on the updated hidden state in response to the current partial processing region not corresponding to a final partial processing region of the input image frame; and
generating an intermediate detection result based on the intermediate context data,
wherein in response to the intermediate detection result indicating that there is a target object in the input image frame, an image processing process on the input image frame is terminated without performing an additional image processing process on at least one subsequent partial processing region.

15. An apparatus for processing an image, the apparatus comprising:
a processor configured to execute instructions; and
a memory to store the instructions,
wherein the execution of the instructions by the processor configures the processor to:
extract a feature of a current partial processing region of an input image frame by inputting pixel data of the current partial processing region into a convolutional neural network (CNN) being a multi-head CNN (MCNN);
update a hidden state of a recurrent neural network (RNN) for a context between the current partial processing region and at least one previous partial processing region of the input image frame by inputting the extracted feature into the RNN; and
generate an image processing result for the input image frame based on the updated hidden state, and wherein the processor is further configured to extract a plurality of intermediate features of the current partial processing region by inputting the pixel data of the current partial processing region into each of plural heads of the MCNN, and generate an encoded feature of the current partial processing region by fusing the plurality of extracted intermediate features.

16. The apparatus of claim 15, wherein the processor is further configured to generate final context data based on the updated hidden state in response to the current partial processing region corresponding to a final partial processing region of the input image frame, and generate the image processing result based on the final context data.

17. The apparatus of claim 15, wherein the processor is further configured to generate intermediate context data based on the updated hidden state in response to the current partial processing region not corresponding to a final partial processing region of the input image frame, and generate an intermediate detection result based on the intermediate context data.

18. The apparatus of claim 15, wherein each partial processing region including the current partial processing region corresponds to a pixel line group for image signal processing (ISP) of an image sensor.

19. The apparatus of claim 15,
wherein, for the update of the hidden state of the RNN, the processor is configured to:
determine whether the current partial processing region of the input image frame is a final partial processing region of the input image frame,
in a case in which the current partial processing region is not the final partial processing region, repeatedly update the hidden state of the RNN through performance of the inputting of the extracted feature of the current partial processing region into the RNN, a generation of intermediate context data based on the updated hidden state, and a generation of an intermediate detection result based on the intermediate context data until the current partial processing region is determined to be the final partial processing region; and
in a case in which the current partial processing region is the final partial processing region, update the hidden state of the RNN by inputting the extracted feature of the current partial processing region into the RNN, generate final context data based on the updated hidden state, and
wherein, for the generation of the image processing result, the processor is configured to generate the image processing result for the input image frame based on the final context data.

20. The apparatus of claim 19, wherein, after each iteration in the case in which the current partial processing region is not the final partial processing region, the processor is configured to determine whether the intermediate detection result indicates the presence of a target object in the input image frame, and terminate any further processing of the input image frame in a case in which the intermediate detection result indicates the presence of the target object in the input image frame.

21. An electronic device, comprising:
a camera configured to generate an input image frame;
a processor configured to execute instructions;
a memory to store the instructions,
wherein the execution of the instructions by the processor configures the processor to:
extract a feature of a current partial processing region of an input image frame by inputting pixel data of the current partial processing region into a convolutional neural network (CNN) being a multi-head CNN (MCNN);

update a hidden state of a recurrent neural network (RNN) for a context between the current partial processing region and at least one previous partial processing region of the input image frame by inputting the extracted feature into the RNN; and generate an image processing result for the input image frame based on the updated hidden state, and wherein the processor is further configured to extract a plurality of intermediate features of the current partial processing region by inputting the pixel data of the current partial processing region into each of plural heads of the MCNN, and generates an encoded feature of the current partial processing region by fusing the plurality of extracted intermediate features.

22. The electronic device of claim 21, wherein the extracting, the updating, and the generating are performed in a low power mode, and the electronic device is configured to:

wake up in response to a result of the generation of the image processing result being that a target object is detected in the input image frame; and in response to the electronic device being woken up in response to the result, perform an operation associated with further image processing in a normal mode with respect to the target object.

23. The electronic device of claim 22, wherein the low power mode comprises an always-on mode.

24. The electronic device of claim 22, wherein the image processing comprises object detection, and the operation associated with the image processing comprises any one or any combination of object tracking, object recognition, and unlocking.

25. The electronic device of claim 21, wherein, for the generation of the image processing result, the processor is configured to:

generate context data based on the updated hidden state;

generate a detection result based on the context data;

determine whether the detection result indicates the presence of target data in the input data frame;

in a case in which the detection result indicates the presence of the target data in the input data frame, terminate any further processing of the input data frame; and in a case in which the detection result does not indicate the presence of the target data in the input data frame, continue processing of the input data frame with respect to a partial processing region of the input data frame that is subsequent to the current partial processing region.

26. The apparatus of claim 25, wherein, in the case in which the detection result does not indicate the presence of the target data in the input data frame and the current partial processing region is a final partial processing region of the input data frame, the processor is configured to generate an image processing result for the input data frame based on the context data.

* * * * *